(12) United States Patent
Greenfield et al.

(10) Patent No.: US 8,594,864 B2
(45) Date of Patent: Nov. 26, 2013

(54) TORQUE BASED POWER LIMIT CUEING SYSTEM AND METHOD

(75) Inventors: Aaron L. Greenfield, Shelton, CT (US); Alex Faynberg, Cheshire, CT (US); Vineet Sahasrabudhe, Cheshire, CT (US); John Rucci, East Longmeadow, MA (US); Glen Knaust, Palm City, FL (US)

(73) Assignee: Sikorsky Aircraft Corporation, Stratford, CT (US)

( * ) Notice: Subject to any disclaimer, the term of this patent is extended or adjusted under 35 U.S.C. 154(b) by 120 days.

(21) Appl. No.: 13/216,867

(22) Filed: Aug. 24, 2011

(65) Prior Publication Data
US 2013/0054053 A1 Feb. 28, 2013

(51) Int. Cl.
*B64C 27/57* (2006.01)
*B64C 27/78* (2006.01)
*B64C 27/82* (2006.01)
*B64C 13/18* (2006.01)
*B64C 13/44* (2006.01)
*B64C 19/00* (2006.01)

(52) U.S. Cl.
USPC ............ 701/14; 701/84; 701/87; 701/90; 701/528; 244/75.1; 244/76 A; 244/76 R; 244/175; 244/196; 244/220

(58) Field of Classification Search
CPC ........ B64C 27/57; B64C 27/78; B64C 27/82; B64C 13/44; B64C 13/18; B64C 19/00
USPC ....... 701/14, 84, 87, 90, 528; 244/75.1, 76 A, 244/76 R, 175, 196, 220
See application file for complete search history.

(56) References Cited

U.S. PATENT DOCUMENTS

| | | | |
|---|---|---|---|
| 5,156,363 A | 10/1992 | Cizewski et al. | |
| 5,339,244 A | 8/1994 | Stiles, Jr. et al. | |
| 5,873,546 A | 2/1999 | Evans et al. | |
| 5,948,023 A | 9/1999 | Evans et al. | |
| 6,255,965 B1 | 7/2001 | D'Orso | |
| 6,695,264 B2 * | 2/2004 | Schaeffer et al. | 244/223 |
| 6,735,500 B2 | 5/2004 | Nicholas et al. | |
| 7,098,811 B2 | 8/2006 | Augustin et al. | |
| 7,148,814 B2 | 12/2006 | Sikora et al. | |
| 7,440,825 B2 | 10/2008 | Einthoven et al. | |
| 7,463,956 B2 | 12/2008 | Einthoven et al. | |
| 7,751,976 B2 | 7/2010 | Matuska et al. | |
| 2006/0071123 A1* | 4/2006 | Nguyen et al. | 244/76 R |
| 2006/0089761 A1* | 4/2006 | Pettigrew et al. | 701/14 |
| 2006/0219840 A1* | 10/2006 | Einthoven et al. | 244/17.13 |
| 2007/0164167 A1* | 7/2007 | Bachelder et al. | 244/220 |
| 2010/0252691 A1* | 10/2010 | Malkin et al. | 244/76 R |
| 2010/0312421 A1* | 12/2010 | Eglin | 701/14 |

* cited by examiner

*Primary Examiner* — Mary Cheung
*Assistant Examiner* — Atul Trivedi
(74) *Attorney, Agent, or Firm* — Cantor Colburn LLP

(57) ABSTRACT

A torque based power limit cueing system is provided and includes an engine computer to compile data relating to torque and additional information of each of one or more engines, an active stick by which tactile cueing are provided to a pilot and by which the pilot inputs control commands, a multi-function display (MFD) by which visible cues are provided to the pilot and a flight control computer (FCC) operably coupled to the engine computer, the active stick and the multi-function display, the FCC being configured to receive the data from the engine computer and to output tactile cue commands and visible commands in accordance with the torque and the additional information of each of the one or more engines to the active stick and the MFD, respectively.

29 Claims, 4 Drawing Sheets

TORQUE BASED POWER LIMIT CUEING SYSTEM AND METHOD

STATEMENT REGARDING FEDERALLY SPONSORED RESEARCH OR DEVELOPMENT

This invention was made with Government support under Contract No. N00019-06-C-0081 awarded by the Department of the Navy. The Government has certain rights in this invention.

BACKGROUND OF THE INVENTION

Modern helicopters have complex, coupled boundaries of operation, which the pilot is required to monitor. Proximity to power limits associated with the engine and transmission are particularly critical for cargo-class helicopters with low power margin conditions in effect. Pilot monitoring of power limits leads to significantly increased workload and failure to successfully monitor power can lead to rotor droop as well as additional fatigue damage.

Research has enumerated a comprehensive set of helicopter limits, including power limits, and studies have been conducted to identify effective methods to cue the pilot to these limits. These studies have determined that heads-up methods, such as tactile cues, were more effective at alerting the pilot in a high-bandwidth manor.

Further work has defined the concept and benefits of care-free maneuvering as well and additional studies have been conducted on tactile cueing of torque limits. Some of these studies determined that predictive algorithms were important for effective power limit tactile cueing and developed advanced algorithms for this purpose. However, where a flying power limit cueing system has been developed, the system does not combine all limits into equivalent torque limits, nor does it reflect real-time variations in all engine performance parameters.

BRIEF DESCRIPTION OF THE INVENTION

A torque based power limit cueing system includes an engine computer to compile data relating to torque and additional information of each of one or more engines, an active stick by which tactile cueing are provided to a pilot and by which the pilot inputs control commands, a multi-function display (MFD) by which visible cues are provided to the pilot and a flight control computer (FCC) operably coupled to the engine computer, the active stick and the multi-function display, the FCC being configured to receive the data from the engine computer and to output tactile cue commands and visible commands in accordance with the torque and the additional information of each of the one or more engines to the active stick and the MFD, respectively.

A torque based power limit cueing system includes an engine computer to compile data relating to engine torque, a maximum continuous power (MCP) engine limit and a maximum power available (MPA) proximity engine limit of each of one or more engines, an active stick by which tactile cueing are provided to a pilot and by which the pilot inputs control commands, a multi-function display (MFD) by which visible cues are provided to the pilot and a flight control computer (FCC) operably coupled to the engine computer, the active stick and the multi-function display, the FCC being configured to receive the data from the engine computer and to output tactile cue commands and visible commands in accordance with the engine torque, the MCP engine limit and the MPA proximity engine limit of each of the one or more engines and results of predefined algorithms to the active stick and the MFD, respectively.

A method of providing a torque based power limit cueing system is provided and includes compiling data relating to engine torque, a maximum continuous power (MCP) engine limit and a maximum power available (MPA) proximity engine limit of each of one or more engines at an engine computer, providing tactile cueing to a pilot by way of an active stick and receiving control commands inputted by the pilot by way of the active stick, providing visible cues to the pilot by way of a multi-function display (MFD), receiving, at a flight control computer, the data from the engine computer and outputting tactile cue commands and visible commands in accordance with the engine torque, the MCP engine limit and the MPA proximity engine limit of each of the one or more engines to the active stick and the MFD, respectively.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In accordance with aspects of the invention, a comprehensive torque-based power limit cueing system is provided. The system consolidates and simplifies the myriad engine and transmission limits into a simple and understandable set of torque-referenced limits and equivalent torque limits and reflects real-time variations in engine performance parameters. The cued limits reflect real-time engine conditions and cue the pilot through visual cues and tactile cues. This combination provides a heads-out-the-window solution or a multi function display (MFD), which is critical to rapid pilot response, with tactile cueing, which has been shown to be one of the highest bandwidth modalities of providing information to the pilot.

The MFD will provide a visual torque-based cue that rolls up various values into a single signal. These values include, for example, a gas generator speed, a gas turbine temperature, an engine torque limit and a gearbox torque limit. These values are constantly reviewed by the flight control computer, which generates the torque-based cue as a single cue event. Meanwhile, the flight control computer further controls servo mechanisms to provide the pilot with tactile cueing at the same time. In one embodiment, this tactile cueing may be provided such that, at an initial limit, the pilot is given stepwise or threshold-ramp cueing and, at a secondary or more severe limit, the pilot is given a stick shaking cueing.

Figure 1:
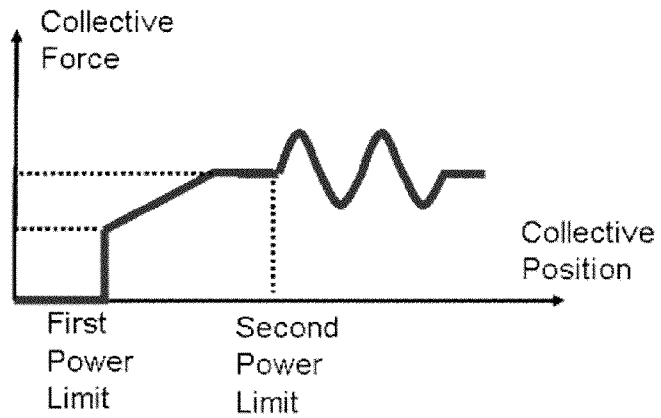
FIG. 1 is a schematic diagram illustrating tactile cueing.

For example, with reference to FIG. 1, a threshold-ramp cue may be applied at high power where gearbox/engine life starts to deteriorate and a second stick shaker cue may be applied at higher power close to maximum power available. As shown in FIG. 1, the threshold-ramp cue includes an initial sharp increase in collective force, followed by a more gradual increase in force. The stick shaker cue is a high-frequency oscillation of the stick. Each cue will be associated with both a gearbox limit and an engine limit and other limits as noted above. Depending on the flight condition, either the engine power or the gearbox rating could be more limiting, and the cue will be felt at the more limiting of the two. Additional cues could also be fit into this framework.

Figure 2:
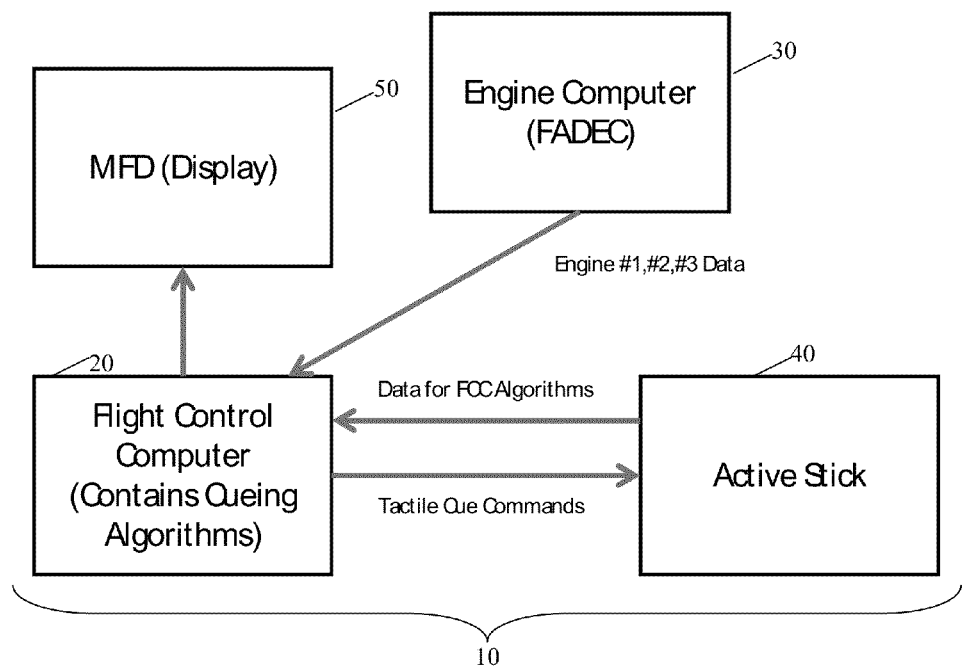
FIG. 2 is a schematic diagram illustrating components of a torque based power limit cueing system.

With reference to FIG. 2, components of a torque based power limit cueing system 10 are provided. The components include a flight control computer (FCC) 20, an engine computer 30, an active stick 40 and an MFD 50. The FCC 20 contains a processing unit and a memory, which are coupled to one another. The memory includes executable instructions, which, when actuated, cause the processing unit to execute various cueing algorithms as will be discussed below. In general, the FCC 20 receives data relating to engine torque and additional information of each of one or more engines (i.e., engine #1, engine #2, engine #3) from the engine computer 30, which compiles that data from various inputs. Here, the additional information may include a maximum continuous power (MCP) engine limit and a maximum power available (MPA) proximity engine limit of each of the one or more engines. In accordance with the various cueing algorithms, the FCC 20 then outputs servo commands as tactile cue commands to the active stick 40 while the active stick 40 issues data for FCC 20 algorithms back to the FCC 20 in a type of a feedback loop. In addition, the FCC 20 outputs additional visible commands to the MFD 50 so that the MFD 50 can display necessary information to a pilot.

Figure 3:
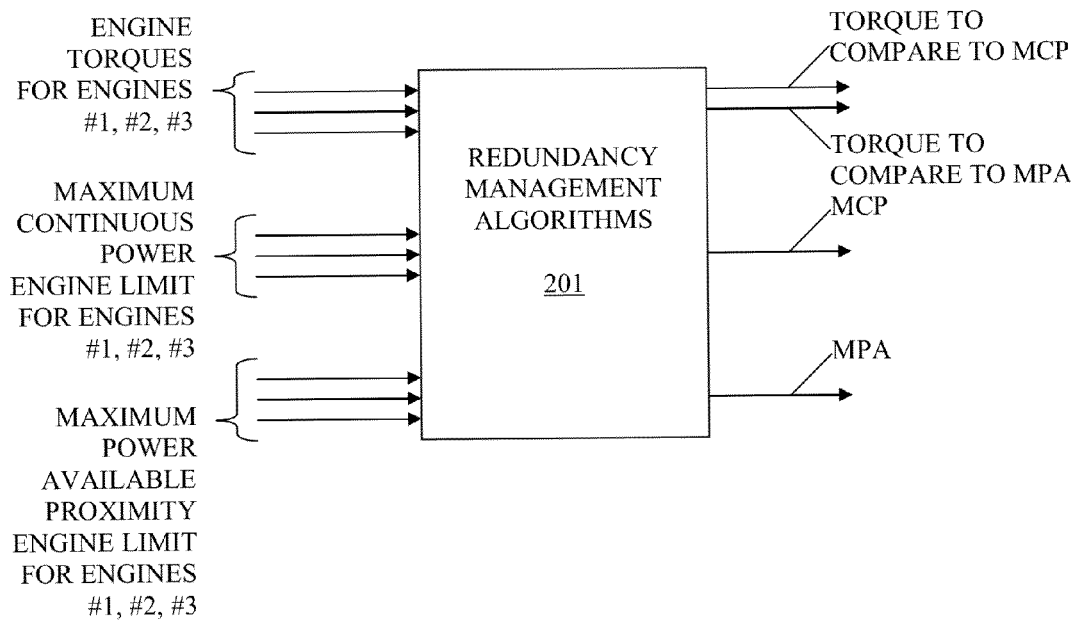
FIG. 3 is a flow diagram illustrating an operation of a flight control computer algorithm.
Figure 4:
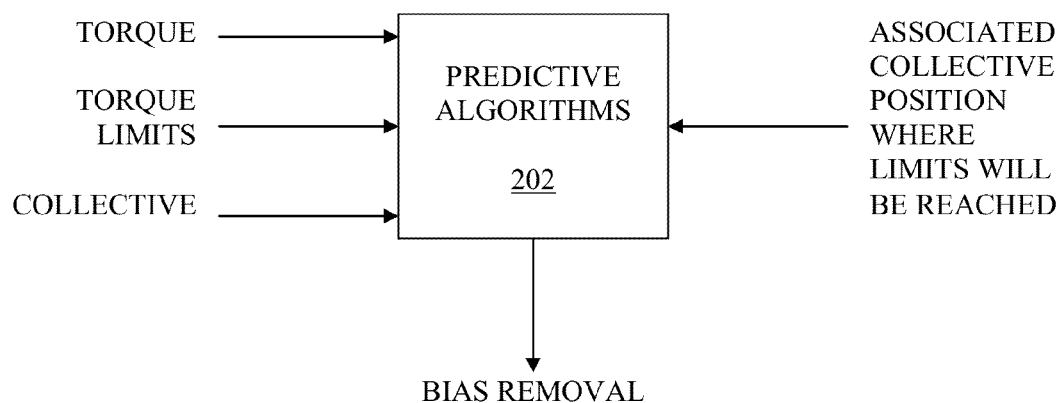
FIG. 4 is a flow diagram illustrating an operation of a flight control computer algorithm.
Figure 5:
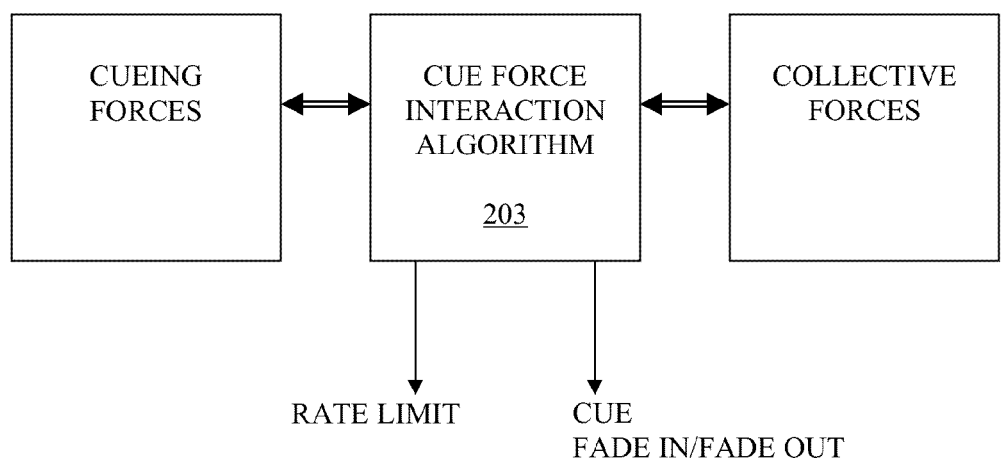
FIG. 5 is a flow diagram illustrating an operation of a flight control computer algorithm.

With reference to FIGS. 3, 4 and 5, there are three major categories of cueing algorithms executed, performed and used by the FCC 20. These include redundancy management algorithms 201, predictive algorithms 202 and cue force interaction algorithms 203. The redundancy management algorithms 201 combine data from multiple engines under a variety of operating and failure conditions. The predictive algorithms 202 correlate torque limits with an associated collective position where the limits will be reached. The cue force interaction algorithms 203 ensure that the power limit cueing forces integrate well with other collective forces as perceived by the pilot.

As shown in FIG. 3, the redundancy management algorithms 201 combine at least three or more sets of engine data into one set under a variety of operating and failure conditions. The key engine parameters to be combined include engine torques, a maximum continuous power (MCP) engine limit and a maximum power available (MPA) proximity engine limit. Where there are three engines being monitored, there are three copies of each of these signals, one from each engine, for a total of 9 signals input into the redundancy management algorithms. The redundancy management algorithms 201 reduce then these 9 input signals down to 4 output signals. The 4 output signals are a single MCP limit value, a single MPA proximity limit value, a torque to compare to the MCP limit value and a torque to compare to the MPA limit value. In addition to providing these outputs, the redundancy management algorithms 201 may also decide if system failures necessitate a disabling of the power limit cueing system.

The redundancy management algorithms 201 first decide on an operational health of the engines. The operational health may be categorized into three states: normal operation, split-torque operation or failed operation. In normal operation, the engines are functioning properly. In split-torque mode, some engine degradation has occurred. For example, there may be loss of power from one engine. In failed operation mode, significant engine degradation (or other degradation) has occurred and the tactile cues are disabled.

In the normal operation mode, the minimum of the three MCP values is selected to use for the MCP limit, the average of the three MPA limits is selected for use, and the average of the engine torques is selected to compare to both the MCP limit and the MPA limit. In the split-torque mode, the MCP value and the torque value to compare to the MPA value are selected from the engine having the least margin between the torque and the limit. A failed engine is not considered eligible in this selection. Also in split-torque mode, the redundancy management algorithms 201 select the torque and MPA proximity limit from the engine having the greatest margin between the torque and the limit. Finally, as noted above, in the failed passive mode, the tactile cues are disabled. This is caused by the loss of active stick capability to produce forces.

As shown in FIG. 4, the predictive algorithms 202 correlate torque limits with an associated collective position where the limits will be reached. This means that when then pilot pulls his stick to the determined cue position, the engine response will be exactly on the limit. The predictive algorithms 202 include a linear model that dynamically correlates collective position to a torque value. This linear model is fitted to flight-test data and is different for different airspeeds and atmospheric conditions, as necessary. The model also contains a gross change if one engine has lost power. Another component of the predictive algorithms is a bias removal element. This component continuously monitors a quality of torque prediction by comparing predicted torque to actual torque. When error between predicted torque and actual torque are determined to exist, the bias removal compensates. The bias removal term also contains logic that allows for the freezing or slowing down of corrections if prediction errors are expected.

As noted above, the cue force interaction algorithms 203 ensure that power limit cueing forces integrate well with other collective forces as perceived by the pilot. Specifically, the collective has collective trim forces, which are required to hold the collective in place when the trim system is engaged. Since the power limit cueing forces drive the collective downward when the pilot is above the cue, and the trim forces hold the collective stationary, there may be a conflict between these two functions for certain regimes of operation. The cueing system 10 then make a decision to allow the trim forces to dominate in these regimes, which in turn requires the collective cueing forces to be faded out (and subsequently faded back in when appropriate).

A speed of the collective cue fading is controlled by the cue force interaction algorithms 203 and a selection of the proper speed is important to the pilot's perception of the cue. Tactile cue fade-in/fade-out times are thus tuned based on pilot evaluation. A longer time constant fade can lead to problems with anticipating the force and may negate the ramp force if rapid trim depressions are used to fine tune a value. By contrast, a shorter time constant fade can lead to an abrupt transition from the trim forces to the cueing force.

An additional algorithm provided by the cue force interaction algorithms provides a rate limit on how quickly the position of a collective cue can move. This is used to smooth out the feel of the cue and may be tuned based upon pilot evaluation. The rate limit can be tuned based on whether the pilot is currently feeling the cue or not, among other factors.

With the FCC 20 being configured to execute the redundancy management algorithms 201, the predictive algorithms 202 and the cue force interaction algorithms 203, the system 10 is able to provide the pilot with torque based power limit cueing by way of tactile cue commands and visible commands in accordance with the torque and the additional information of each of the one or more engines. For example, the torque information may include engine torques of each of the engines and the additional information may include a maximum continuous power (MCP) engine limit and a maximum power available (MPA) proximity engine limit for each of the engines.

Figure 6:
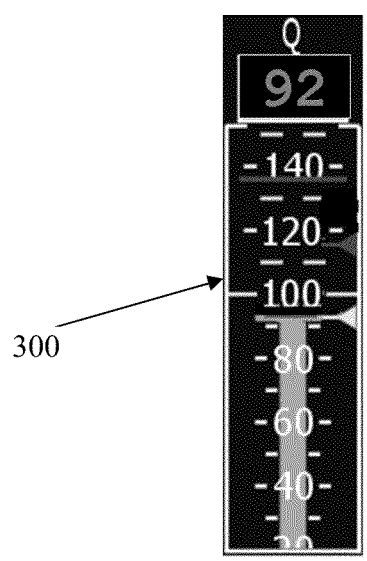
FIG. 6 is a torque based limit indicator displayed on a multi-function display (MFD).

With reference to FIG. 6, an exemplary torque based limit indicator 300 in accordance with the present invention is illustrated and may be displayed on a multi-function display (MFD) for a pilot. As shown in FIG. 6, required torque to hover in a given test flight was close to threshold ramp force and a normal controlled takeoff was performed in the ramp force area. Onset of the stick shaker cue successfully prevented torque transients and the power available between cues was adequate to perform a normal takeoff and deceleration to hover. An obstacle takeoff was also performed with an external load placed in close proximity to the slope landing area and, in this case, required torque was significantly increased such that power required entered and remained in the threshold-ramp cue area and into the stick shaker cue region. A nominal force was significant when trim release was depressed and may play a role in determining appropriate amplitude of the stick shaker cue. Continued operation in the stick shaker cue region allowed for adequate obstacle clearance and served as a reminder to decrease power demand when a safe altitude was reached.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A torque based power limit cueing system, comprising:
an engine computer to compile data relating to engine torque limits, gas generator speed limits, gas turbine temperature limits, gearbox torque limits and additional information of each of one or more engines including a maximum continuous power (MCP) engine limit and a maximum power available (MPA);
an active stick by which tactile cueing are provided to a pilot and by which the pilot inputs control commands;
a multi-function display (MFD) by which visible cues of the MCP and the MPA are provided to the pilot; and
a flight control computer (FCC) operably coupled to the engine computer, the active stick and the multi-function display, the FCC being configured to receive the data from the engine computer and to output tactile cue commands and visible commands in accordance with the torque and the additional information of each of the one or more engines to the active stick and the MFD, respectively,
the tactile cue commands comprising first and second tactile cue commands at first and second limits, respectively, the first and second limits each being associated with the torque and the additional information, the second tactile cue command being different from the first tactile cue command and the second limit being more severe than the first limit.

2. The system according to claim 1, wherein the first tactile cue command comprises a threshold-ramp cue and the second tactile cue command comprises a stick shaker cue.

3. The system according to claim 1, wherein the FCC executes redundancy management algorithms, predictive algorithms and cue force interaction algorithms.

4. The system according to claim 3, wherein the redundancy management algorithms combine data from multiple engines under a variety of operating and failure conditions.

5. The system according to claim 3, wherein the predictive algorithms correlate torque limits with an associated collective position where the limits will be reached.

6. The system according to claim 3, wherein the cue force interaction algorithms ensure that the power limit cueing forces integrate with other collective forces.

7. A torque based power limit cueing system, comprising:
an engine computer to compile data relating to engine torque, a maximum continuous power (MCP) engine limit and a maximum power available (MPA) proximity engine limit of each of one or more engines;
an active stick by which tactile cueing are provided to a pilot and by which the pilot inputs control commands;
a multi-function display (MFD) by which visible cues are provided to the pilot; and
a flight control computer (FCC) operably coupled to the engine computer, the active stick and the multi-function display, the FCC being configured to receive the data from the engine computer and to output tactile cue commands and visible commands in accordance with the engine torque, the MCP engine limit and the MPA proximity engine limit of each of the one or more engines and results of predefined algorithms to the active stick and the MFD, respectively,
the tactile cue commands comprising first and second tactile cue commands at first and second limits of the engine torque, the MCP engine limit and the MPA proximity limit, respectively, the second tactile cue command being different from the first tactile cue command and the second limit being more severe than the first limit.

8. The system according to claim 7, wherein the first tactile cue command comprises a threshold-ramp cue and the second tactile cue command comprises a stick shaker cue.

9. The system according to claim 7, wherein the predefined algorithms comprise redundancy management algorithms, predictive algorithms and cue force interaction algorithms.

10. The system according to claim 9, wherein the redundancy management algorithms combine data from multiple engines under a variety of operating and failure conditions.

11. The system according to claim 9, wherein the predictive algorithms correlate torque limits with an associated collective position where the limits will be reached.

12. The system according to claim 9, wherein the cue force interaction algorithms ensure that the power limit cueing forces integrate with other collective forces.

13. A method of providing a torque based power limit cueing system, comprising:
compiling data relating to engine torque, a maximum continuous power (MCP) engine limit and a maximum power available (MPA) proximity engine limit of each of one or more engines at an engine computer;
providing tactile cueing to a pilot by way of an active stick and receiving control commands inputted by the pilot by way of the active stick;

providing visible cues to the pilot by way of a multi-function display (MFD);

receiving, at a flight control computer, the data from the engine computer;

outputting first tactile cue commands and visible commands in accordance with first limits of the engine torque, the MCP engine limit and the MPA proximity engine limit of each of the one or more engines to the active stick and the MFD, respectively; and outputting second tactile cue commands, which are different from the first tactile cue commands, and visible commands in accordance with second limits of the engine torque, the MCP engine limit and the MPA proximity engine limit of each of the one or more engines to the active stick and the MFD, respectively, the second limits being more severe than the first limits.

14. The method according to claim 13, wherein the outputting comprises outputting the first tactile cue command as a threshold-ramp cue and outputting the second tactile cue command as a stick shaker cue.

15. The method according to claim 14, wherein the outputting of the threshold-ramp cue is applied at a high power where gearbox/engine life starts to deteriorate.

16. The method according to claim 15, wherein the outputting of the stick shaker cue is applied at a higher power close to a maximum power available.

17. The method according to claim 13, wherein outputting comprises executing redundancy management algorithms, predictive algorithms and cue force interaction algorithms.

18. The method according to claim 17, wherein the executing of the redundancy management algorithms comprises combining data from multiple engines under a variety of operating and failure conditions.

19. The method according to claim 17, wherein the executing of the predictive algorithms comprises correlating torque limits with an associated collective position where the limits will be reached.

20. The method according to claim 17, wherein the executing of the cue force interaction algorithms comprises ensuring that the power limit cueing forces integrate with other collective forces.

21. The method according to claim 17, wherein the executing of the cue force interaction algorithms comprises allowing collective trim forces to dominate over collective cue forces.

22. The method according to claim 17, wherein the executing of the cue force interaction algorithms comprises fading-in and fading-out of collective cue forces upon disengagement and engagement of trim forces.

23. The method according to claim 17, wherein the executing of the cur force interaction algorithms comprises rate limiting a position of a collective cue.

24. The method according to claim 17, wherein the executing of the redundancy management algorithms comprises categorizing engine health a normal operation state, a split-torque operation state or a failed operation state.

25. The method according to claim 24, wherein the executing of the redundancy management algorithms in the normal state comprises:

selecting a minimum MCP value for the MCP engine limit;

selecting an average MPA proximity engine limit for the MPA proximity engine limit; and comparing an average of engine torques to the MCP engine limit and the MPA proximity engine limit.

26. The method according to claim 25, wherein the executing of the redundancy management algorithms in the split-torque operation state comprises selecting the minimum MCP value and the engine torques of an engine having a least margin between the engine torques and the minimum MCP value.

27. The method according to claim 17, wherein the executing of the predictive algorithms comprises dynamically correlating collective position to a torque value for different airspeeds and atmospheric conditions.

28. The method according to claim 17, wherein the executing of the predictive algorithms comprises changing a linear model in an event an engine loses power.

29. The method according to claim 17, wherein the predictive algorithms comprise bias removal algorithms including logic that allows for freezing or slowing down of corrections if prediction errors are expected.

* * * * *